(12) United States Patent
Ahmed

(10) Patent No.: US 7,497,882 B2
(45) Date of Patent: Mar. 3, 2009

(54) METHOD OF OPERATING A FUEL CELL

(75) Inventor: Khaliq Ahmed, Rowville (AU)

(73) Assignee: Ceramic Fuel Cells Limited, Victoria (AU)

( * ) Notice: Subject to any disclaimer, the term of this patent is extended or adjusted under 35 U.S.C. 154(b) by 147 days.

(21) Appl. No.: 10/510,081

(22) PCT Filed: Apr. 22, 2003

(86) PCT No.: PCT/AU03/00479

§ 371 (c)(1),
(2), (4) Date: Mar. 18, 2005

(87) PCT Pub. No.: WO03/092102

PCT Pub. Date: Nov. 6, 2003

(65) Prior Publication Data

US 2005/0158594 A1    Jul. 21, 2005

(30) Foreign Application Priority Data

Apr. 23, 2002  (AU) .................................. PS1934

(51) Int. Cl.
*C10J 3/46* (2006.01)

(52) U.S. Cl. ............... 48/197 R; 48/127.1; 48/75; 48/63; 48/61; 48/127.9; 48/198.7; 48/198.3; 429/19; 429/20; 429/17; 429/30; 429/12; 422/187; 422/188; 422/189

(58) Field of Classification Search ............ 48/75, 48/102 R, 105, 107, 111–112, 93–95, 209, 48/211–213, 215, 214 R, 214 A, 197 FM
See application file for complete search history.

(56) References Cited

U.S. PATENT DOCUMENTS

| 3,476,534 | A | 11/1969 | Buswell et al. |
| 5,360,679 | A * | 11/1994 | Buswell et al. ............... 429/19 |
| 5,795,666 | A | 8/1998 | Johnssen |
| 6,726,836 | B1 * | 4/2004 | Lesieur et al. ............... 208/217 |
| 2001/0020596 | A1 | 9/2001 | Jossens et al. |

FOREIGN PATENT DOCUMENTS

| DE | 10019548 A | 10/2001 |
| WO | WO-00/39873 A | 7/2000 |
| WO | WO-01/44412 A | 6/2001 |
| WO | WO-01/60950 A1 | 8/2001 |
| WO | WO-03/038937 A1 | 5/2003 |

OTHER PUBLICATIONS

Derwent Abstract Accession No. 2001-451664/48.

* cited by examiner

*Primary Examiner*—Alexa D. Neckel
*Assistant Examiner*—Kaity Handal
(74) *Attorney, Agent, or Firm*—Birch, Stewart, Kolasch & Birch, LLP

(57) ABSTRACT

A method of generating hydrogen for use in a fuel cell system, which comprises processing a fuel which is essentially free of organic sulfur-containing compounds to produce a hydrogen-containing stream.

12 Claims, 1 Drawing Sheet

METHOD OF OPERATING A FUEL CELL

Figure 1:
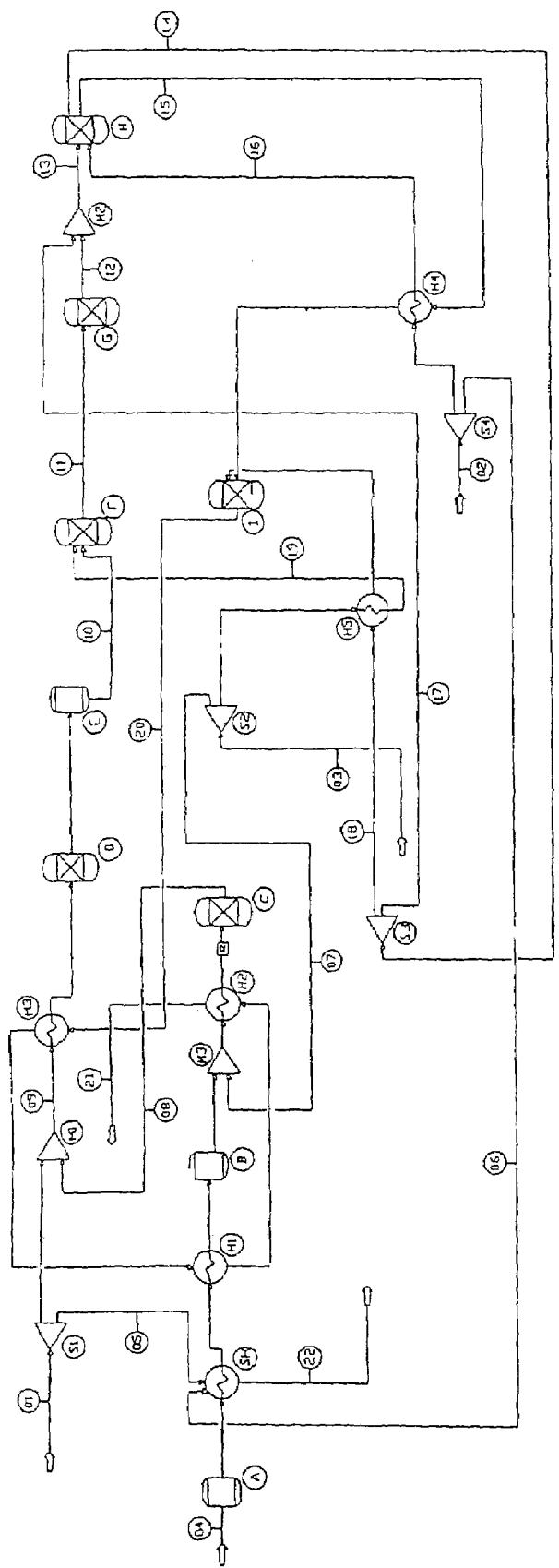

The present invention relates to a method of generating hydrogen for use in a fuel cell system, and to fuel cell systems incorporating the method.

It is now quite conventional to run fuel cells such as solid oxide fuel cells (SOFCs) on hydrocarbon fuels as the primary fuel supply. The hydrocarbon fuel is typically processed upstream of the fuel cell using a pre-reformer to provide a stream comprising hydrogen which is then delivered to the fuel cell anode. Even though hydrogen is not used as the primary fuel in these systems, hydrogen is required for processing of the primary hydrocarbon fuel. The hydrocarbon fuel used typically includes sulfur in the form of organic sulfur-containing compounds, such as mercaptans and thiophenes, and it is important to remove these species from the fuel to avoid poisoning of the anode or other catalysts used in the fuel cell system. Conventionally this is done using a hydrodesulfuriser unit consisting of a hydrogenation catalyst (to convert the organic sulfur-containing compounds into hydrogen sulfide and sulfur-free hydrocarbons) and a hydrogen sulfide desulfuriser adsorbent bed. The hydrogenation catalyst requires a continuous supply of hydrogen in order to affect the desired conversion of the organic sulfur-containing compounds.

Hydrogen may also be required during system start-up and shutdown. Typically, the catalysts used for the pre-reformer and anode of a fuel cell system are manufactured in a reduced state and must be maintained as such prior to use. The use of hydrogen on start-up enables in situ reduction of the catalysts which alleviates the burden of having to manufacture and maintain them in reduced state.

It is also undesirable to use a hydrocarbon fuel on start-up as this can lead to catalyst poisoning due to the presence of sulphur species. Until the system is running the temperature is too low to carry out desulfurisation effectively (about 380 to 400° C. is usually required). The use of hydrogen on start-up enables the system to be warmed up until desulfurisation of hydrocarbon fuel may be carried out. Similarly, on shutdown the temperature will at some point fall below that at which desulfurisation may be effectively accomplished. In this case use of hydrocarbon fuel will lead to catalyst poisoning due to the presence in the fuel of sulfur-containing compounds. For this reason on shutdown it would be preferable to replace the hydrocarbon fuel with hydrogen.

Conventional, relatively small scale generation of hydrogen for these purposes tends not to be economically viable and in some cases is faced with the same problem of even smaller scale availability of hydrogen for start-up. For example, it has been proposed to supply hydrogen from pressurised cylinders. This tends to be expensive and somewhat inconvenient given the accompanying need to monitor the amount of hydrogen remaining and to replace cylinders as necessary. The use of pressurised cylinders to supply hydrogen may also be perceived to be hazardous.

With this in mind the present invention seeks to provide a method for producing hydrogen for use in a fuel cell system which is economic, which is convenient and safe to implement and which may be integrated as part of the overall system design.

Accordingly, the present invention provides a method of generating hydrogen for use in a fuel cell system, which comprises processing a fuel which is essentially free of organic sulfur-containing compounds to produce a hydrogen-containing stream. Hydrogen generated by processing of the fuel may be used downstream in the fuel cell system, for example in the hydrodesulfurisation of a primary hydrocarbon fuel supplied to the fuel cell system and/or to avoid the problems associated with start-up and shutdown described. The invention also provides a method of operating a fuel cell comprising processing this fuel which is free of organic sulfur-containing compounds to produce a hydrogen-containing stream. The present invention yet further provides a fuel cell system comprising a fuel processor which is supplied with this type of fuel and which is capable of producing hydrogen from it.

An important aspect of the invention resides in the type of fuel which is processed. The fuel is essentially free of organic sulfur-containing compounds. Such compounds would poison catalysts typically used in the fuel cell systems. The fuel may include minor amounts of sulfur-containing organic compounds, typically at most 1 ppm by volume, in which case some catalyst poisoning will be tolerated. Preferably, however, the fuel Will include only trace amounts (up to 0.1 ppm by volume) or be entirely free of sulfur-containing organic compounds. Obviously, the fuel must also be of the type which yields hydrogen when processed and how this processing may be carried out is discussed in greater detail below. Herein useful fuels are termed clean fuels or biofuels. Suitable fuels, some of which are commercially available, include bioethanol, biodiesel, rapeseed oil, rapeseed methyl ester, canola oil, canola methyl ester, corn oil, hemp oil, switch grass oil, fatty acid methyl esters, linseed oil, linseed methyl ester, sunflower oil, sunflower oil methyl ester, soy bean oil, palmitic acid, lauric acid, stearic acid and lanoleic acid. Mixtures of any two or more of these may also be used.

The fact that the fuel used is essentially free of organic sulfur-containing compounds means that it can be delivered to the processor without the need for hydrogenation and subsequent adsorbence of sulfur-containing species. The fuel may contain $H_2S$ which can be removed in a conventional desulfuriser (adsorbent bed). It will be appreciated that hydrogenation is not called for in this case. The fuel may contain some other types of non-hydrocarbon sulfur-containing compounds, such as COS and $CS_2$, which may be removed using known types of adsorbent beds. Preferably, however, the clean fuel is devoid of non-hydrocarbon sulfur-containing compounds also. This said, a desulfuriser may be included to allow for flexibility in the type of clean fuel which may be used. A variety of conventional adsorbent beds may be used. It is preferred to use a high temperature adsorbent bed as low temperature beds require frequent regeneration and condensable hydrocarbons can rapidly saturate the adsorbent. Thus, the bed may be selected from high temperature zinc oxide and low temperature beds such as activated carbon and activated zeolite. Low temperature zinc oxide may also be used. The operating temperature of the bed will have an impact in terms of its location relative to any heater used to heat the input for the fuel processor. When a low temperature adsorbent bed is used, the bed is upstream of any heater used. When the bed must be operated at high temperature, it is provided downstream of the heater. When present, the desulfuriser is provided upstream of the point at which any water (steam) required for operation of the fuel processor is introduced. The presence of steam tends to cause poor operation of the desulfuriser.

It is an important feature of the present invention that processing of the clean fuel produces hydrogen. A variety of fuel processors may be used including steam reformers, autothermal reformers and partial oxidation reactors.

When a reformer is used to carry out the steam reforming it is of conventional type and may be operated under usual conditions. Typically, the reformer includes a conventional reforming catalyst such as nickel, iron, cobalt, platinum, palladium, rhodium, or any other metal in Group VIII of the Periodic Table, or a combination of two or more of these. Preferably, the catalyst is nickel supported on a refractory metal oxide such as alumina, silica, magnesia, zirconia etc. The reformer is usually operated at a temperature of 300-800° C. To achieve a suitable temperature the clean fuel to the reformer is heated prior to its introduction. A heater is used to pre-heat the primary hydrocarbon fuel used for the fuel cell and this heater may also be used to heat the clean fuel. However, on start-up no heat is likely to be available from that heater and the clean fuel is then usually heated by an electrical heater or by a small fuel-fired heater, such as a natural gas burner. Preferably, however, the clean fuel is heated using a heater which runs on the same primary hydrocarbon fuel as used for the fuel cell, and the primary fuel supply may be split accordingly to facilitate this. This enables a more compact system to be produced. When the fuel cell is operational heat generated by it may be used to heat the clean fuel, for example by use of anode waste stream recycle and heat exchangers.

The reformer also requires steam and water may be supplied to it from an independent water tank. Preferably, however, water for reforming the clean fuel is drawn from the same supply as used to supply water used in other parts of the fuel cell system, for example to process the primary hydrocarbon fuel.

As noted, processing of the clean fuel may be achieved using an autothermal reformer (ATR) or a partial catalytic oxidation (POX) reactor. Autothermal reforming combines catalytic partial oxidation and steam reforming reactions, the catalytic partial oxidation providing heat for the endothermic (steam) reforming reaction.

Catalytic partial oxidation takes place over a suitable catalyst. Typically, the catalyst comprises platinum, palladium or rhodium, preferably platinum and palladium, provided on a refractory metal oxide such as alumina, silica, magnesia, zirionia etc. The temperature at which catalytic partial oxidation takes place is typically 400° C. to 900° C., and the clean fuel may be heated as described above in connection with operation of the (steam) reformer.

In an autothermal reformer the catalytic partial oxidation usually tales place in a first catalytic zone. The steam reforming catalyst of the autothermal reformer is typically provided in a second catalyst zone. The catalyst used for the steam reforming reaction may comprise any of the catalytic metals known to be useful for steam reforming, such as nickel, cobalt, platinum and ruthenium and mixtures thereof. The catalyst may be used in the form of a particulate bed or supported on an inert carrier support, as mentioned above for the partial oxidation catalyst. The autothermal reformer is usually operated at a temperature of 300 to 900° C., and the input stream to it may be heated accordingly, as is described above in connection with operation of (steam) reformer. Any of the fuel processors may also be fitted with a heated (platinum) element to assist cold start-up.

On start up of the system there is no steam available for reforming in the autothermal reformer. Initially therefore the autothermal reformer is run dry as a partial oxidation reactor. Some steam may be introduced externally, though this is not essential. Preferably, water for the autothermal reformer is drawn from the same supply as used to supply water used in other parts of the fuel cell system.

If the clean fuel is processed using a desulfuriser upstream of the fuel processor, any difference in temperature between the desulfuriser output and the desired fuel processor input will necessitate cooling or heating of the clean fuel. Typically, the desulfuriser runs at the same temperature or at a lower temperature than the fuel processor. When the desulfuriser operates at a lower temperature heat must be supplied to the clean fuel prior to introduction to the fuel processor.

In a preferred embodiment of the invention, hydrogen produced by processing of the clean fuel in accordance with the present invention is used in the hydrodesulfurisation of a hydrocarbon fuel used as the primary fuel for the fuel cell. The output of the fuel processor may therefore be mixed with the primary fuel and delivered to a hydrogenation catalyst where organic sulfur-containing compounds are converted to $H_2S$ and/or non-sulfur-containing hydrocarbons. This may be achieved using conventional equipment and processing conditions. Conventional hydrogenation catalysts such as Co—Mo or Ni—Mo may be used. Prior to hydrogenation the primary hydrocarbon fuel is typically heated so that the input stream for hydrogenation is at a suitable temperature for the hydrogenation catalyst being used. When using a Co—Mo catalyst, the input stream is usually at a temperature of approximately 380 to 400° C.

Usually, the concentration of hydrogen delivered to the hydrogenation catalyst is between 3 and 5% by volume based on the volume of the primary fuel used. This means that processing of the clean fuel to generate hydrogen must be carried out before hydrogenation of the primary fuel can commence. Typically, hydrogen generation is commenced a couple of hours in advance of start-up of the fuel cell to build-up sufficient hydrogen. Shorter start-up times for the hydrogen generation are preferred, for example 15-30 minutes before start-up of the fuel cell.

Subsequent to hydrogenation hydrogen sulfide is removed to produce a desulfurised fuel stream. This may be achieved in the same manner as described above for removing non-hydrocarbon sulfur-containing compounds from the clean fuel. Thus, any of the conventional adsorbent beds may be used, though in practice a high temperature adsorbent bed will be used as this avoids unnecessary cooling of the output from the hydrogenation catalyst. When high temperature ZnO is used ZnS is formed according to the reaction:

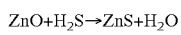

$$ZnO+H_2S \rightarrow ZnS+H_2O$$

Continued reaction leads to consumption of the adsorbent so that it must be changed periodically. The sulfur in its adsorbed form may be discarded or used for further chemical processing, for example to regenerate the adsorbent.

Hydrodesulfurisation results in a desulfurised primary fuel stream which is then subjected to further processing prior to delivery to the anode of a fuel cell. The sulfur content of the fuel is typically reduced to a level of less than about 1 part per million by volume, and preferably to less than 0.1 parts per million by volume.

How the primary hydrocarbon fuel is processed will depend upon whether the fuel cell is capable of internal reforming, i.e. whether the anode of the fuel cell is provided with a catalyst effective for reforming methane present in the primary hydrocarbon fuel, or produced from the pre-reforming of that fuel, in order to generate hydrogen. If the anode does not have this functionality, the primary hydrocarbon fuel must be reformed externally to the fuel cell in order to generate the hydrogen used as fuel at the anode. The primary hydrocarbon fuel may be processed using a conventional steam pre-reformer/reformer, autothermal reformer or partial catalytic oxidation reactor, as described above. The extent to which the primary hydrocarbon fuel is processed/reformed will also depend upon the internal reforming capability of the anode of the fuel cell.

The primary function of the pre-reformer is to remove higher hydrocarbons and produce a stream with varying levels of hydrogen, methane, steam and carbon oxides depending upon the operating temperature of the pre-former. The pre-reforming operation may be carried out in conventional manner. Steam pre-reforming is conveniently performed at atmospheric pressure, but higher pressures may be adopted if desired, for example up to about 1000 kPa. Steam pre-reforming is usually performed at a temperature no greater than 450° C., more preferably in a range of about 250-450° C. and, dependent upon the fuel and other process parameters, most usually in a range of about 300-400° C. Under low load the temperature is likely to be increased to 600-650° C. In the pre-reformer higher hydrocarbons are reformed to form carbon monoxide, carbon dioxide, hydrogen and methanes Generally, the steam pre-reforming process will be carried out such that the higher hydrocarbons fuel is resident over the pre-reforming catalyst for a sufficient time to ensure at least substantially complete conversion of the higher hydrocarbons. This alleviates deposition of carbon on the anode in the downstream fuel cell when hydrocarbons are reformed on the anode. However, some higher hydrocarbons may be present in the output fuel stream and preferably there is 97.5% or greater conversion of hydrocarbons in the steam pre-reforming process. More preferably, there is no more than about 0.1% by volume higher hydrocarbons present in the fuel stream to the anode measured on a water basis. A variety of conventional steam pre-reformers are known and any of these may be used. The common pre-reformer catalyst is nickel-based, but may comprise, for example, platinum, rhodium, other precious metals or a mixture of any of these.

Depending upon the operation of the fuel cell, at least a portion of the reformed clean fuel may be delivered to the anode of the fuel cell rather than being mixed with primary hydrocarbon fuel for downstream processing. This is advantageous on start-up or shutdown, when the temperature may be insufficient to achieve sulfur removal leading to sulfur poisoning of downstream catalysts. The reformed clean fuel is free from the damaging sulfur compounds and may therefore be used as fuel for the fuel cell in order to avoid this problem.

As mentioned above, the present invention also embraces a fuel cell system which utilises the hydrogen-generating method described. Preferably, that part of the system responsible for generating hydrogen from clean fuel is integrated as far as possible with the remainder of the system so that the overall design is compact and efficiency enhanced. Thus, the anode waste stream may be used to supply heat and/or steam to upstream components and processes and the anode waste stream may be split accordingly. For instance, the anode waste stream may be passed in thermal exchange with the clean fuel and/or primary hydrocarbon fuel. The anode waste stream may also supply at least part of the steam required for processing of the clean fuel and/or the primary hydrocarbon fuel.

The present invention is illustrated in the accompanying non-limiting FIGURE which is a schematic of a fuel cell system. The following key will assist in understanding the FIGURE.

LINE IDENTIFICATION

01. Primary fuel
02. Air
03. Water
04. Clean fuel
05. Start-up fuel
06. Start-up air
07. Water to clean fuel reformer
08. $H_2$-rich stream for hydrodesulphuriser (HDS)
09. Primary Fuel+$H_2$ for HDS
10. Desulphurised fuel
11. Pre-reformed fuel
12. Reformed fuel (non-internal reforming fuel cell)
13. Reformed fuel+recycled anode exhaust
14. Anode exhaust
15. Cathode exhaust
16. Pre-heated air
17. Recycled anode exhaust
18. Anode exhaust to catalytic combustor
19. Steam supply to pre-reformer
20. Catalytic combustor exhaust
21. Exhaust
22. Start-up heater exhaust

EQUIPMENT IDENTIFICATION

A. Desulphuriser (ambient temperature) for clean fuel
B. Desulphuriser (elevated temperature) for clean fuel
C. Clean fuel reformer
D. Hydrodesulphuriser
E. Desulphuriser for primary fuel
F. Pre-reformer
G. Reformer
H. Fuel-cell
I. Catalytic combustor
SH. Start-up heater
S1, S2, S3, S4—Stream splitters
M1, M2, M3—Stream mixers
H1, H2, H3, H4, H5—Heat exchangers In the system shown a clean fuel (04) such as biodiesel is used to generate hydrogen utilised by other parts of the system. The FIGURE shows two desulfuriser units (A) and (B) but only one of these would typically be present in practice. If the clean fuel is sulfur-free, such as biodiesel, the desulfuriser may be omitted altogether. Desulphuriser unit (A) is a cold desulififiser and operates at ambient temperature. Desulfuriser unit (B) is a high temperature desulfuriser operating at elevated temperature. Unit (B) is therefore positioned downstream of components which heat the clean fuel (04). Irrespective of its position the desulfuriser unit (A,B) removes non-hydrocarbon sulfur-containing compounds from the clean fuel (04). The clean fuel (04) may be heated initially using a start-up heater (SH) and in the FIGURE this is identified as start-up fuel stream (05). The heater (SH) is supplied with the same primary hydrocarbon fuel (01) as that upon which the fuel cell is operated. A portion of the primary fuel (01) maybe delivered to the start-up heater using a stream splitter (S1). Start-up air (06) is also supplied to the start-up heater (SH) by splitting of the main air supply (02) for the fuel cell using a stream splitter (S4).

Subsequent to removal of the sulfur-containing compounds, the clean fuel is delivered to a stream mixer (M3) where it is mixed with water stream (07), itself supplied via a stream splitter (S2) from a water supply (03) used to deliver water to the other components of the fuel cell system. The fuel and steam mixture is then delivered to a clean fuel reformer (C) which produces a hydrogen-containing stream (08) from the clean fuel. When the fuel cell is operational the fuel may be heated using a heat exchanger (H2) upstream of the reformer (C).

In the embodiment shown the output of the reformer (C) is delivered to a stream mixer (M1) where it is mixed with primary hydrocarbon fuel (01), i.e. hydrogen is mixed with the primary hydrocarbon fuel, to produce a hydrogen-enriched fuel stream (09). This fuel stream (09) is then delivered to a hydrodesulfuriser (D) provided with a hydrogenation catalyst. Here organic sulfur-containing compounds present in the primary fuel (01) are hydrogenated, the hydrogen necessary for this being provided by the earlier processing of the clean fuel (04). A heat exchanger (H3) may supply heat when the fuel cell is operational. The fuel stream is then delivered to an adsorbent bed (E) where sulfur-containing species are adsorbed. The result is a desulfurised fuel stream (10) suitable for subsequent processing.

The desulfurised fuel stream (10) is then delivered to a steam pre-reformer (F) supplied with steam (19) from the main water supply (03) via a stream splitter (S2) and heat exchanger (H5). A pre-reformed fuel stream (11) results and this is delivered to a reformer (G) where further reforming takes place to produce a fully reformed fuel (12) (in the system illustrated the anode of the fuel cell does not have internal reforming capability). When the fuel cell is operational, the reformed fuel (12) is mixed with a recycled portion (17) of the anode exhaust (14) to form a fuel cell supply stream (13), the latter being delivered to (the anode of) a fuel cell (H). The cathode of the fuel cell (H) (not shown separately) is supplied with air (02) via a heat exchanger (H4).

The anode exhaust (14) may be used to supply steam and heat to upstream processes and components, as will be apparent from the FIGURE. The cathode exhaust (15) may also be used to supply heat to upstream processes and components. A portion of the anode exhaust (14) and cathode exhaust (15) are burned in a catalytic combustor (I).

The system illustrated may be modified for use with a fuel cell having internal reforming functionality on the anode. In this case the essential difference in system design is that the reformer (G) would be omitted.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

The claims defining the invention are as follows:

1. A method of generating hydrogen for use in a fuel cell system, which comprises processing a fuel which is essentially free of organic sulfur-containing compounds to produce a hydrogen-containing stream,
   wherein the hydrogen-containing stream is used for hydrodesulfurisation of a primary hydrocarbon fuel supplied to the fuel cell system, and wherein in the method the fuel that is essentially free of organic sulfur-containing compounds is not the same fuel as the primary hydrocarbon fuel,
   wherein the fuel that is essentially free of organic sulfur-containing compounds is processed without having been subjected to hydrodesulfurisation, and
   wherein the fuel is processed to produce a hydrogen-containing stream using a steam reformer, autothermal reformer or partial oxidation reactor.

2. A method according to claim 1, wherein the hydrogen-containing stream is used as fuel for the fuel cell system during start-up of the system.

3. A method according to claim 1, wherein the hydrogen-containing stream is used as fuel for the fuel cell system during shut down of the system.

4. A method according to claim 1, wherein the fuel which is processed contains at most 0.1 ppm by volume sulfur.

5. A method according to claim 4, wherein the fuel which is processed contains at most 0.1 ppm by volume sulfur.

6. A method according to claim 5, wherein the fuel which is processed is entirely free of sulfur.

7. A method according to claim 1, wherein the fuel which is processed is selected from bioethanol, biodiesel, rapeseed oil, rapeseed methyl ester, canola oil, canola methyl ester, corn oil, hemp oil, switch grass oil, fatty acid methyl esters, linseed oil, linseed methyl ester, sunflower oil, sunflower oil methyl ester, soy bean oil, palmitic acid, lauric acid, stearic acid, lanoleic acid and mixtures of any two or more of these.

8. A method according to claim 1, wherein the hydrogen-containing stream is mixed with a primary fuel and delivered to a hydrogenation catalyst where organic sulfur-containing compounds in the primary fuel are converted to $H_2S$ and/or non-sulfur-containing hydrocarbons.

9. A method of operating a fuel cell which comprises generating a hydrogen-containing stream by the method as claimed in claim 1.

10. A fuel cell system comprising a fuel processor selected from a steam reformer, an autothermal reformer and a partial oxidation reactor which is used to produce a hydrogen-containing stream from a fuel that is essentially free of organic sulfur-containing compounds,
    wherein the hydrogen-containing stream is used for hydrodesulfurisation of a primary hydrocarbon fuel that is supplied to the fuel cell system and that is not the same as the fuel that is essentially free of organic sulfur-containing compounds, and
    wherein the fuel cell system does not include means for hydrodesulfurisation of the fuel that is essentially free of organic sulfur-containing compounds.

11. A system according to claim 10, wherein the hydrogen-containing stream is used as flue for the fuel cell system during start-up of the system.

12. A system according to claim 10, wherein the hydrogen-containing stream is used as fuel for the fuel cell system during shut down of the system.

* * * * *